United States Patent Office 2,972,562
Patented Feb. 21, 1961

2,972,562
2,2,3,4,5,5-HEXACHLORO-3-CYCLOPENTEN-1-OL

Sidney B. Richter, Chicago, Ill., assignor to Velsicol Chemical Corporation, Chicago, Ill., a corporation of Illinois No Drawing. Filed Feb. 9, 1959, Ser. No. 791,828

2 Claims. (Cl. 167—30)

This invention relates to a new chemical composition of matter. More specifically, this invention relates to the new chemical compound 2,2,3,4,5,5-hexachloro-3-cyclopenten-1-ol of the structure

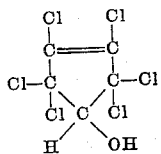

This compound can be obtained by the reduction of hexachloro-3-cyclopentenone with reducing agents such as lithium aluminum hydride or aluminum isopropoxide. The required hexachloro-3-cyclopentenone can be obtained, for example, as described by Prins, Rec. trav. chim., 68, 384–6 (1949). The reduction is conveniently carried out in a solvent or diluent such as isopropanol or ethyl ether. While the reduction can often be carried out satisfactorily at normal room temperature, reaction temperatures up to about the reflux temperature of the solvent or diluent employed can be used.

It has also been found that the compound of this invention can be prepared from hexachloro-2-cyclopentenone, for example, by refluxing the ketone with lithium aluminum hydride in solution. Heat isomerization evidently takes place to produce the desired chlorinated 3-cyclopentenol from the chlorinated 2-cyclopentenone, a starting material which can be prepared, for example, as described by Newcomer and McBee, J. Am. Chem. Soc., 71, 946 (1949). The manner in which the new compound of this invention can be prepared is illustrated in the following detailed examples.

EXAMPLE 1

*Reduction of hexachloro-2-cyclopentenone with lithium aluminum hydride*

Hexachloro-2-cyclopentenone, M.P. 28° C., was prepared by the treatment of octachlorocyclopentene with concentrated sulfuric acid according to Newcomer and McBee.

Lithium aluminum hydride (8.56 g.; 0.22 mole) was added to 500 ml. dry ether in a 1-liter, 3-necked, round-bottomed flask fitted with a reflux condenser, mechanical stirrer, and dropping funnel. Hexachloro-2-cyclopentenone (57.8 g.; 0.2 mole) was then added in portions with stirring over a period of 75 minutes, and the mixture was refluxed for 1 hour. The mixture was cooled and treated dropwise with water and then with 20% sulfuric acid. The layers were separated, and the water layer was extracted with ether. The combined ether solutions were then dried over magnesium sulfate and filtered. The residue obtained by removal of the ether in vacuo was distilled to give 20.5 g. of distillate and 14.4 g. of tarry residue. Redistillation gave a fraction, boiling point 68–78° C. at 0.19 mm. pressure, which solidified partially on standing. The crystals were filtered off and recrystallized from pentane to give 2,2,3,4,5,5-hexachloro-3-cyclopenten-1-ol, melting point 79–80.5° C.

Analysis for $C_5H_2Cl_6O$.—Theory: C, 20.64%; H, 0.69%; Cl, 73.17%. Found: C, 20.85%; H, 0.85%; Cl, 73.24%.

EXAMPLE 2

*Reduction of hexachloro-3-cyclopentenone with aluminum isopropoxide*

Hexachloro-2-cyclopentenone, M.P. 28° C., was distilled very slowly through a 14-inch Vigreaux column under a nitrogen atmosphere according to Prins. The temperature at the top of the column ranged from 200–225° C. Two recrystallizations of the product from pentane gave hexachloro-3-cyclopentenone, M.P. 86–92° C.

Hexachloro-3-cyclopentenone (15 g.; 0.052 mole) and aluminum isopropoxide (10 g.; 0.052 mole) were mixed with 100 ml. of freshly distilled isopropanol and allowed to stand for 72 hours. Most of the solvent was then removed in vacuo, and the residue was hydrolyzed with dilute hydrochloric acid. The product was extracted with ether, washed first with dilute hydrochlroic acid and then with water, and dried over calcium chloride. The residue remaining after removal of the ether in vacuo was treated with Nuchar CN in acetone solution. The acetone was removed in vacuo, and the residue was taken up in pentane. Chilling the pentane solution in the refrigerator gave 8.5 g. of 2,2,3,4,5,5-hexachloro-3-cyclopenten-1-ol, which had a melting point of 79–81° C. after two recrystallizations from pentane.

EXAMPLE 3

*Reduction of hexachloro-3-cyclopentenone with lithium aluminum hydride*

Lithium aluminum hydride (2.1 g.; 0.055 mole) was added to 350 ml. of dry ether in a 1-liter, 3-necked, round-bottomed flask fitted with a reflux condenser, mechanical stirrer, and dropping funnel. Hexachloro-3-cyclopentenone (27.5 g.; 0.097 mole) in 100 ml. dry ether was then added dropwise with stirring over a period of 45 minutes. The mixture was then refluxed for 45 minutes and cooled. The complex was broken up with 20% sulfuric acid, and the ether layer was separated. The aqueous layer was extracted with ether, and the combined ether solutions were dried over magnesium sulfate and filtered. Removal of the ether in vacuo gave 13.5 g. of crude 2,2,3,4,5,5-hexachloro-3-cyclopenten-1-ol, which had a melting point of 79–81.5° C. after two recrystallizations from pentane.

The new compound of this invention is useful as a pesticide, particularly as a fungicide and herbicide. This was illustrated by experiments in which the toxicity of experimental compounds to test spores was determined by the slide germination technique adopted by the Committee on Standardization of Fungicidal Tests of the American Phytopathological Society. Measured concentrations of spores were placed on glass slides in contact with different concentrations of the compound being tested. The percentage germination of spores was then determined for each treatment after 24 hours' incubation at 72° F. Two replicates were run at each concentration. The results obtained with 2,2,3,4,5,5-hexachloro-3-cyclopenten-1-ol are summarized in the following table.

| Concn., p.p.m. | Organism | Percent Spore Germination | | | ED50,[1] p.p.m. |
|---|---|---|---|---|---|
| | | Rep. 1 | Rep. 2 | Ave. | |
| 100 | *Fusarium roseum* | 2 | 0 | 1 | 42 |
| 1,000 | *Stemphylium sarcinaeforme* | 0 | 0 | 0 | 320 |
| 100 | *Monilinia fructicola* | 0 | 0 | 0 | 15 |

[1] Dosage effective for 50% control.

Pesticidal compositions of this invention are prepared by mixing the new compound of this invention with inert carriers to provide formulations adapted for ready and efficient application with conventional applicator equipment to the site of the pest infestation. For example, pesticidal compositions or formulations according to this invention are prepared in the form of solids or liquids. Solid compositions are preferably in the form of dusts. These are prepared to give homogeneous, free-flowing dusts by admixing the active compound of this invention with finely divided solids such as the talcs, natural clays, pyrophyllite, diatomaceous earth, fuller's earth, or flours such as walnut shell, wheat, redwood, soya bean, or cottonseed flours. Other inert solid carriers of the type ordinarily used in preparing pest control compositions in dusts or powdered form can also be used.

Liquid compositions according to this invention are prepared by admixing the new compound of this invention with a suitable inert liquid diluent. In some cases the compound is sufficiently soluble in the common pesticide solvents such as kerosene, xylene, fuel oil, the alkylated naphthalenes, and the like so that it can be used directly as solutions in these substances. However, the pesticidal compositions of this invention can also contain a surface-active agent of the kind used in the art to enable the active compound to be readily dispersed in water or other liquids to give sprays, which are a preferred method of applying the active compound of this invention. The surface-active agents can be of the anionic, cationic or nonionic types. Typical examples of such surface-active agents are sodium stearate, potassium laurate, morpholine oleate, sodium lauryl sulfate, sodium 2-ethylhexyl sulfate, sodium naphthalenesulfonate, sodium alkylnaphthalenesulfonate, sodium sulfosuccinate, sodium oleic acid sulfonate, sodium castor oil sulfonate, glycerol monostearate containing a soap (or a sodium fatty alcohol sulfate), lithium stearate, magnesium oleate, aluminum stearate, methyl cellulose, sodium salt of ligninsulfonic acid, polyoxyethylene fatty alcohol ethers, polyglycol fatty acid esters, polyoxyethylene modified fatty acid esters, polyoxyethylene-polyol fatty acid esters, polyoxypropylene fatty alcohol ethers, polypropylene glycol fatty acid esters, polyoxypropylene modified fatty acid esters, polyoxypropylene-polyol fatty acid esters, polyol fatty acid monoesters, lecithin, di- and higher polyhydric alcohol fatty acid esters, cholesterol and other fatty acid esters, lanolin, oxidized fatty oils, quaternary ammonium salts such as lauryl dimethyl benzyl ammonium chloride, amine hydrochlorides such as laurylamine hydrochloride, alkylated aryl polyether alcohols such as the condensation product of diamylphenol with ethylene oxide, and the like. Mixtures of such agents can be used to combine or modify properties. The proportion of these agents will ordinarily vary from about 1% or less to about 15% by weight of the pesticidal compositions. Other pesticides as well as such substances as fertilizers, activators, adhesives, spreaders, and synergists can be added to these formulations if desired. The manner in which typical pesticidal compositions according to this invention can be prepared is illustrated in the following examples. All quantities given are in parts by weight.

EXAMPLE 4

Preparation of an emulsifiable concentrate

The following ingredients are blended thoroughly until a homogeneous liquid concentrate is obtained. This concentrate is mixed with water to give an aqueous dispersion containing the desired concentration of active compound for use as a spray.

| | |
|---|---|
| 2,2,3,4,5,5-hexachloro-3-cyclopenten-1-ol | 25 |
| Sodium lauryl sulfate | 2 |
| Sodium lignin sulfonate | 3 |
| Kerosene | 70 |

EXAMPLE 5

Preparation of a wettable powder

The following components are mixed intimately in conventional mixing or blending equipment and are then ground to a powder having an average particle size of less than about 50 microns. The finished powder is dispersed in water to give the desired concentration of active compound.

| | |
|---|---|
| 2,2,3,4,5,5-hexachloro-3-cyclopenten-1-ol | 75.00 |
| Fuller's earth | 22.75 |
| Sodium lauryl sulfate | 2.00 |
| Methyl cellulose | .25 |

EXAMPLE 6

Preparation of an oil-dispersible powder

The following components are blended and ground as described in the previous example to give a powder which can be dispersed in oil to form a spray containing the desired concentration of active compound.

| | |
|---|---|
| 2,2,3,4,5,5 - hexachloro - 3 - cyclopenten - 1 - ol | 70 |
| Condensation product of diamylphenol with ethylene oxide | 4 |
| Fuller's earth | 26 |

EXAMPLE 7

Preparation of a dust

The following ingredients are mixed thoroughly and then ground to an average particle size of less than about 50 microns to give a dust suitable for application with conventional dusting equipment.

| | |
|---|---|
| 2,2,3,4,5,5 - hexachloro - 3 - cyclopenten - 1 - ol | 20 |
| Talc | 80 |

EXAMPLE 8

Preparation of a granular formulation

The following ingredients are mixed with sufficient water to form a paste, which is then extruded, dried, and ground to give granules, preferably from about 1/32 to 1/4 inch in diameter. The granules are applied with fertilizer spreader equipment or other conventional apparatus. The dextrin in this formulation serves as a binding agent.

| | |
|---|---|
| 2,2,3,4,5,5 - hexachloro - 3 - cyclopenten - 1 - ol | 10 |
| Fuller's earth | 66 |
| Dextrin | 20 |
| Sodium lignin sulfonate | 3 |
| Kerosene | 1 |

When the compound and compositions of this invention are used as fungicides to control or prevent plant diseases caused by fungi or bacteria, they are used in several ways, depending on the nature of the disease, and the nature of the plant attacked. They may be used as preventive agents to form a toxic barrier between the inoculum and the host tissue, to inhibit the production of inoculum, or to destroy the inoculum before it reaches the site of infection. They may be used as eradicating agents to destroy the disease-producing organism or its inoculum on the host tissue or in the soil. They may be used as curatives or therapeutic agents to destroy the disease-producing organisms within the plant tissues, halt their growth, or inhibit the development of their toxins or counteract them. They may also be used as prophylactic agents to immunize plants against disease. The compound of this invention can be useful in any one or more of the above aways, but since it is much easier to protect plants from disease rather than to cure disease, the chemical is best used in the form of a protectant. This protective chemical can act to prevent sporulation and thus reduce or eliminate the inoculum necessary for the spread of a disease. It can also prevent spores from completing their germination or incubation stage so that no infection ensues. This eradicant chemical, which can also be considered broadly as a protectant, is used to destroy disease-producing organisms or their inoculum in the soil, in dead plant organs, or on living plant tissue. When used to treat soil or seed, this compound is usually referred to as a disinfectant or disinfestant. The compound of this invention is also useful for the control of fungal growth on wood, plastics, textiles, and like materials.

When used for the control of plant diseases, the compound of this invention can be used in seed treatments, soil treatments, or plant treatments. Many of the disease-producing bacteria and the fungi that cause blights, spots, and rots are carried on or in seeds, roots, bulbs, tubers, corms, or other seed stock that is purchased by growers. These disease-producing organisms can be destroyed by dipping the seed or planting stock in liquid formulations of the compound of this invention. Many plant pathogens are also soil-borne, and the application of the active compound to the soil is one of the useful methods for control or eradication of the organisms, particularly in greenhouses, cold frames, hotbeds, and seedbeds. Both solid and liquid compositions of the compound of this invention can be used in such soil treatments, which are also effective for soil nematode control. Plant treatments by the chemical in the form of liquid or solid fungicidal compositions are made on growing crops or on crop residues either to prevent the appearance or spread of diseases or to destroy the disease-causing organisms already present or both. This type of treatment is essential for plant protection from air-borne pathogenes and is also useful in controlling many seed- and soil-borne pathogenes that spread externally to the upper parts of plants. Such treatment includes the application of the active chemical internally to prevent or destroy diseased conditions. The active compound of this invention can be applied by any of these methods in amounts sufficient to exert the desired pesticidal action. The amount of the active compound present in the pesticidal compositions as actually applied for destroying or preventing pest infestations varies with the type of application, the particular pests which are to be controlled, the purpose for which the treatment is made, and the like. Generally, the solid or liquid pesticidal compositions of this invention will contain from about 0.5% to about 90% of the active compound.

I claim:
1. 2,2,3,4,5,5-hexachloro-3-cyclopenten-1-ol.
2. A method of destroying undesirable fungi which comprises contacting said fungi with a fungicidal composition comprising an inert carrier and as the essential active ingredient, in a quantity which is injurious to said fungi, the compound of claim 1.

References Cited in the file of this patent

UNITED STATES PATENTS

| | | |
|---|---|---|
| 2,597,843 | Linn | May 27, 1952 |
| 2,739,161 | Carlson | Mar. 20, 1956 |

OTHER REFERENCES

Roberts: Chemistry and Industry (Feb. 1, 1958), pages 110–115 (6 pages).